(12) United States Patent  (10) Patent No.: US 6,695,348 B2
Holly  (45) Date of Patent: Feb. 24, 2004

(54) RV STABILIZER

(76) Inventor: Richard J. Holly, 1920 Collyer Dr., Redding, CA (US) 96003

( * ) Notice: Subject to any disclaimer, the term of this patent is extended or adjusted under 35 U.S.C. 154(b) by 0 days.

(21) Appl. No.: 09/947,237

(22) Filed: Sep. 5, 2001

(65) Prior Publication Data

US 2002/0027354 A1 Mar. 7, 2002

Related U.S. Application Data

(60) Provisional application No. 60/230,147, filed on Sep. 5, 2000.

(51) Int. Cl.[7] .................................................. B60S 9/02
(52) U.S. Cl. ............................... 280/763.1; 52/DIG. 11
(58) Field of Search ...................... 280/763.1; 254/419; 52/DIG. 11; 248/352, 354.3, 354.4, 354.5; 296/167; 414/498

(56) References Cited

U.S. PATENT DOCUMENTS 3,081,065 A  *  3/1963 Dalton ..................... 280/763.1
3,089,711 A  *  5/1963 Tantlinger et al. ........ 280/763.1
3,197,235 A  *  7/1965 Chieger .................... 280/763.1
3,253,839 A  *  5/1966 Warren ..................... 280/763.1
3,367,614 A  *  2/1968 Leonard ...................... 248/354
3,454,251 A  *  7/1969 Dye .......................... 248/354
3,537,724 A  * 11/1970 Matthews ................ 280/763.1
3,823,958 A  *  7/1974 Trejbal ..................... 280/763.1
3,933,372 A  *  1/1976 Herndon ................... 280/763.1
4,304,078 A  * 12/1981 Meriwether, Jr. ........... 248/354
5,575,492 A  * 11/1996 Stone .......................... 280/475
6,142,488 A  * 11/2000 Orr ........................... 280/6.153

FOREIGN PATENT DOCUMENTS

WO      WO 92/14003    *  8/1992  ............ 52/DIG. 11

* cited by examiner

Primary Examiner—Brian L. Johnson
Assistant Examiner—G B Klebe
(74) Attorney, Agent, or Firm—John P. Wooldridge

(57) ABSTRACT

An adaptation to coach landing legs of a recreational vehicle, trailer or the like improves vehicle stability through the use of crossed and clamped stabilizer rods attached by pins or by magnet attachment to the landing legs.

17 Claims, 2 Drawing Sheets

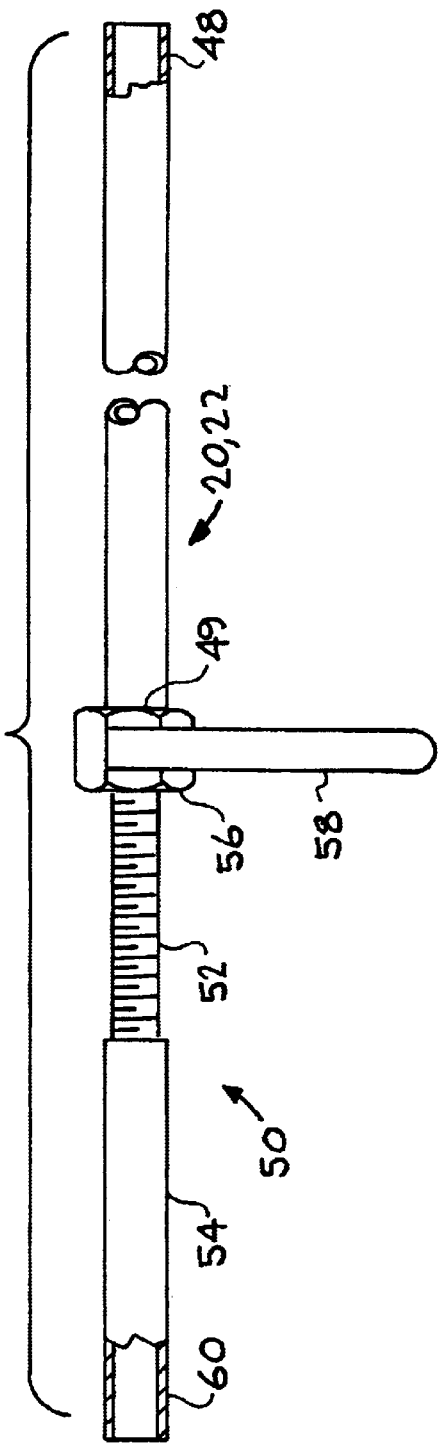
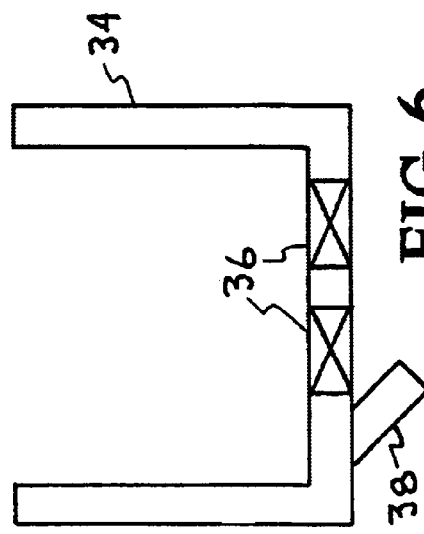
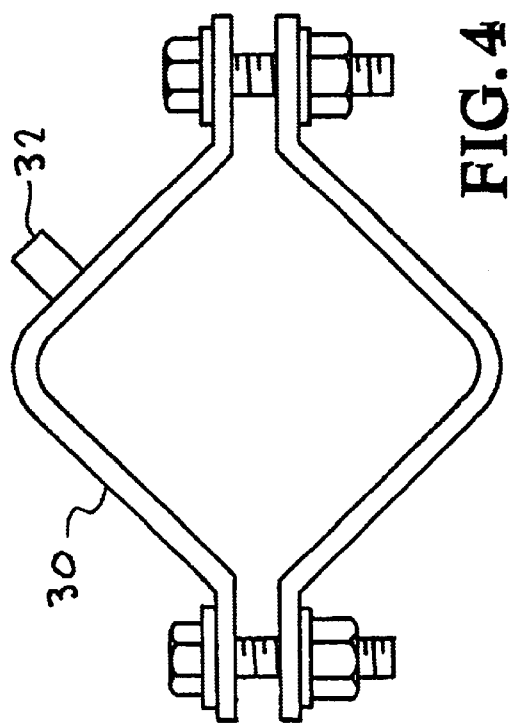

RV STABILIZER

This application claims priority to Provisional Patent Application Serial No. 60/230,147, titled "The Boss RV Stabilizer," filed Sep. 5, 2000, incorporated herein by reference.

BACKGROUND OF THE INVENTION

1. Field of the Invention

The present invention relates to stabilization mechanism, and more specifically, it relates to an apparatus for stabilizing storage, transportation and recreational vehicles.

2. Description of Related Art

A fifth wheel recreational vehicle (RV) rides on a suspension system suitable for supporting the RV as it is pulled by another vehicle. Motorized RVs are also carried on a suspension system suitable for their transport on roadways. Such suspension systems do not provide adequate stability to support internal comfort of people once the RV has been parked.

Various devices are known in the art that provide a means of stability for a broad class of vehicles including recreational vehicles, cargo trailers, cabin trailers, vehicles designated as fifth wheel trailers, and the like.

A commonly used stabilizer utilizes jack stands that are extended under the RV. The extensions are held in place with pins. This type of stabilizer is heavy, difficult to operate and to store.

Other stabilizers are intended as complete (i.e., with landing legs and pads) and are mounted as stabilizing and leveling systems. These have frame attachments, e.g., bolts and nuts or screws with flanges, plus ways to deploy and adjust them. The mechanism is typically a manually driven jackscrew (the usual method), or by electric (e.g., U.S. Pat. Nos. 4,103,869 and 6,224,102) or hydraulic drives (e.g., U.S. Pat. No. 3,767,226).

Other inventions are intended to temporarily support and stabilize an unattached fifth wheel trailer, and do so by extending a footing to the fifth wheel connector pin. Generically, they have two to four telescoping legs with various pads and interconnecting devices using rods or chains.

Some inventions are intended to temporarily stabilize a vehicle with or without leveling the vehicle, including heavy-duty equipment besides the above-mentioned trailers. These inventions are primarily jacks or telescoping footings that attach to couplings or flanges, or they clamp or bolt to the frame of the vehicle. Multiple footing devices are constrained by chains, rods or straps.

Each of these inventions is predominantly installed as a stand-alone system to support, stabilize and optionally level the trailer. Consequently, they are bulky, often difficult to install or to store and require tools for tightening bolts or drilling mounting fixtures. They are not intended for use on trailers with existing landing leg support systems.

It would be desirable if the invention were easy to attach to the existing landing leg supports, be satisfactory in function, simple to detach and easy to store for use.

SUMMARY OF THE INVENTION

It is an object of the present invention to provide an apparatus and method for stabilizing the landing legs of a fifth wheel or other recreational vehicle (RV).

It is another object of the invention to provide an RV stabilization device that provides stability, is easy to install and easy to store.

These and other objects will be apparent to those skilled in the art based on the disclosure herein.

In one embodiment, the landing leg clamps of the device are affixed around the top of upper telescoping landing legs. The clamps are aligned so that a threaded pin projects outwardly from the clamp and points inwards to the other landing leg. Long pins are inserted through the alignment holes of the landing pads such that the flat end of the pin also projects inward to the other landing leg.

Each stabilizer rod comprises a pair of rods, one end of which is hollow and the other end is indented or it forms a hole. An all-thread rod is used onto which a nut with a welded lever is placed. The all-thread rod is either press-fitted into the hollow ends of the other rods, or has nuts welded into the hollow ends into which the rods screw.

The stabilizer rods are placed over the leg clamp pin and the similarly configured opposing end of the stabilizer rod slides over the projecting end of the other landing leg pad pin. The levered nut on the center all-thread rod is used turnbuckle-fashion to tension the stabilizer rod against the opposing pins. The second stabilizer rod is similarly affixed across the opposite ends of the two landing legs so that the stabilizer rods form an X-configuration. A C-style clamp is placed in the center at the crossover of the stabilizer rods to reduce flexing of the rods.

Another embodiment of the invention replaces the pin attachment of the landing leg clamps with a magnetic clamp and the stabilizer rods are placed through holes in the leg clamps and are magnetically held in place.

BRIEF DESCRIPTION OF THE DRAWINGS

FIG. 4 shows an embodiment of the landing leg clamps of the present invention.

FIG. 5 shows an embodiment of the stabilizer rods of the present invention.

FIG. 6 shows an alternate leg clamp.

DETAILED DESCRIPTION OF THE INVENTION

Figure 1:
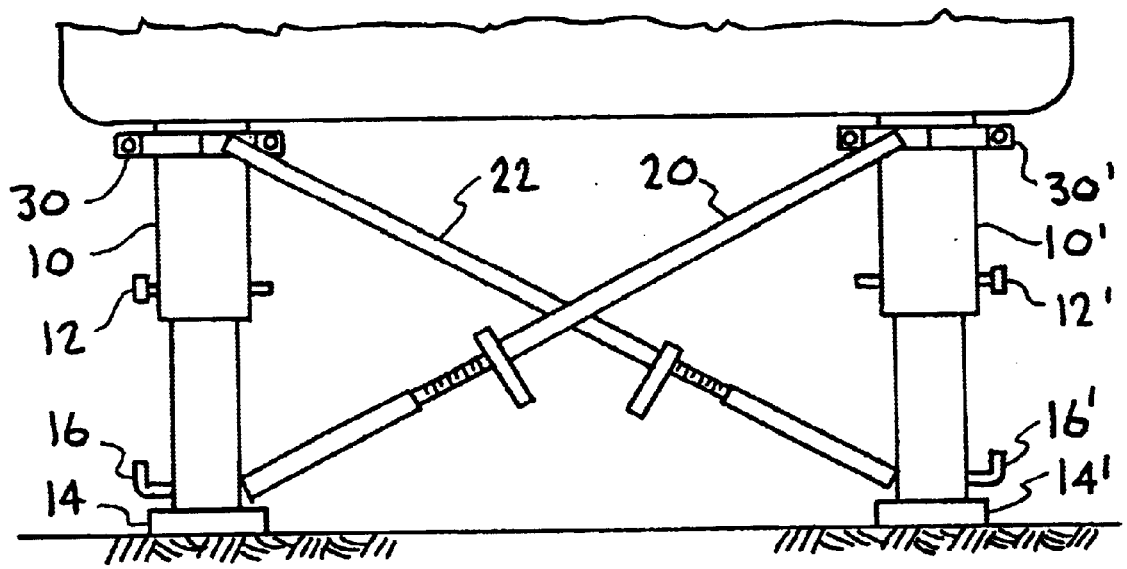
FIG. 1 shows an embodiment of the present invention connected to the coach landing legs of a recreational vehicle.

Referring to FIG. 1, the coach landing legs 10 and 10', which are part of the recreational vehicle (RV) coach itself, are extended down to the ground and held in their vertically expanded position with an adjustment pin 12 and 12'. A foot 14 and 14' is placed on each landing leg and held thereon with a pin 16 and 16'. A leg clamp 30 and 30' with an extending portion 32 (shown in FIG. 4) and 32' is placed around the upper portions of each of the landing legs 10 and 10' respectively. One end of a first stabilizer rod 22 is attached to the extending portion 32 of the leg clamp 30 that is attached to landing leg 10. The other end of stabilizer rod 22 is attached to the inwardly positioned portion of an adjustment pin 16' that holds the foot 14' onto landing leg 10'. In like manner, a second stabilizer rod 20 is attached to the extending portion 32' of the leg clamp 30' that is attached to landing legs 10'. The other end of stabilizer rod 20 is attached to the inwardly positioned portion of an adjustment pin 16 that holds the foot 14 onto landing leg 10. A center clamp 24 (shown in FIG. 3) is placed around the crossing portion of stabilizer rod 20 and 22 to rigidly support the RV.

Figure 2:
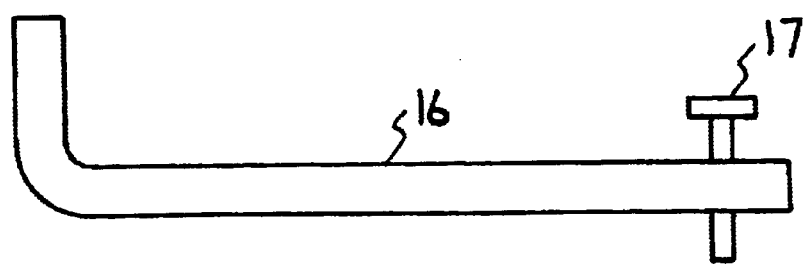
FIG. 2 shows the adjustment pins of the present invention.

FIG. 2 shows details of an embodiment of adjustment pin 16. A securing pin 17 is provided to ensure that the adjustment pin 16 and the foot 14 are not inadvertently removed from the landing leg. As briefly discussed above, each adjustment pin 16 is connected to the end of a stabilizer rod. The adjustment pin may be replaced with alternate means for connecting the stabilizer rods to the lower portion of the landing leg. Such alternate means will be apparent to those skilled in the art based on the teachings of the present invention. For example, in embodiments where the landing legs operate without feet or where the feet are pre-attached or attached by alternate means to the landing legs, a lower leg clamp similar to leg clamp 30, or an equivalent, may be placed on the lower portion of the landing legs.

Figure 3:
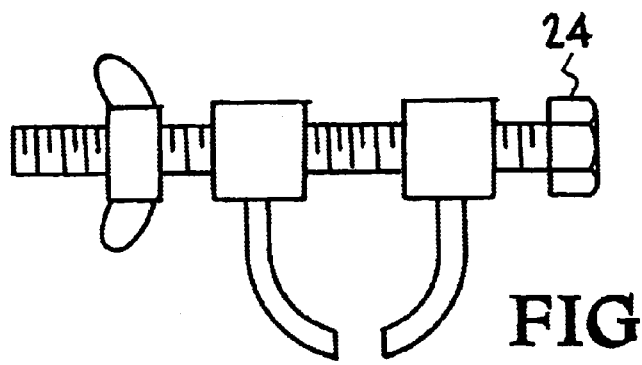
FIG. 3 shows an embodiment of the center clamp for placement at the crossover point of the stabilizer rods.

Referring to FIG. 1 and FIG. 3, the stabilizer rods 20 and 22 may each comprise a steel tube that cross and are held rigidly in place with a center clamp 24 (FIG. 3). The Center Clamp is shown with its two gripping finger-like extensions and the bolt and wing nut for tool-less tightening. Alternate clamping mechanisms may be substituted for the center clamp 24. See, e.g., C-clamps, K-body clamps, pivot clamps, etc.

As discussed above, leg clamps 30 (FIG. 4) and 30' are attached around the upper end of each coach landing leg. Each leg clamp includes an extending portion 32 or 32'. An embodiment of the extending portion 32 is fabricated by threading a hole through the wall of the leg clamp 30 and putting a nut onto a piece of all-thread that is threaded into the hole. Alternately, a nut may be threaded onto a setscrew that is threaded into the threaded hole. Leg clamp 30 includes a pair of securing bolts to tighten the leg clamp around the coach landing leg. FIG. 6 show an alternate means of rigid attachment to the upper portion of the landing legs. The C shaped structure 34 is formed to surround three sides of the landing legs and is rigidly connected to the landing legs with permanent magnets 36. Extending portion 38 is provided to function in a manner similar to extending portion 32 of leg clamp 30.

Referring to FIG. 5, one end 48 of an embodiment of stabilizer rods 20, which is usually identical to stabilizer rod 22, has an indented portion or a hole to allow it to be inserted onto either the inner face of the adjustment pin 16 or onto the extending portion 32 of a leg clamp 30. The other end 49 of stabilizer rod 20 is hollow to receive a stabilizer rod adjustment end 50, which includes a length (e.g., 12" by ⅝") of all-thread 52 onto which is screwed an (e.g., ⅝") adjusting nut 56 that has a piece of flat stock 58 welded thereto. Alternately, the stabilizer rod may include an inner thread on end 49 to receive the all-thread. One end of the stabilizer rod adjustable end 50 has a metal tube 54 threaded thereon which has an end 60 that has an indented portion or a hole. Accordingly, each stabilizer rod 20 and 22 can be extended to a desired position and locked into place using the adjusting nut 56. One end of the stabilizer rod is press fit onto the extending portion 32 of the leg clamp and the other end is press fit onto the inner face of the adjustment pin 16. The other stabilizer rod is likewise emplaced and when the center clamp is tightened, the entire structure further rigidities, providing a stable support for a fifth wheel or other recreational vehicle.

One embodiment of the present invention is made of two steel tubes of ¾ inch electrical metallic tubing (EMT). The end pieces of the EMT are machined on a lathe (e.g., a CNC lathe) for precision and then are pressed into the end rods. The end rods are made with a 12 inch all-thread rod with a ⅝ inch nut on which a 3" by ¾" piece of flat stock is welded. This provides for adjustment. The device fits between the landing legs and acts as a scissors truss.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. A vehicle stabilization apparatus, comprising:
   a first leg clamp for attachment to a first landing leg of said vehicle;
   a second leg clamp for attachment to a second landing leg of said vehicle;
   a first means for attachment to a lower portion of said first landing leg of said vehicle;
   a second means for attachment to said second landing leg of said vehicle;
   a first stabilizer rod for attachment between said first leg clamp and said second means for attachment;
   a second stabilizer rod for attachment between said second leg clamp and said first means for attachment; and
   a center clamp for clamping said first stabilizer rod and said second stabilizer rod together, wherein said first stabilizer rod comprises a hollow end configured to receive a stabilizer rod adjustment end and wherein said second stabilizer rod comprises a second hollow end configured to receive a second stabilizer rod adjustment end.

2. The apparatus of claim 1, wherein said vehicle comprises a recreational vehicle.

3. The apparatus of claim 1, wherein said first means for attachment comprises a first pin for insertion through a hole in said first landing leg, wherein said second means for attachment comprises a second pin for insertion through a hole in said second landing leg.

4. The apparatus of claim 3, further comprising a first foot or base for attachment on said first landing leg, wherein said first foot is attached with said first pin, wherein said apparatus further comprises a second foot or base for attachment to said second landing leg, wherein said second foot is attached with said second pin.

5. The apparatus of claim 4, wherein said first pin comprises a first securing pin to ensure that said first foot is not inadvertently removed from said first landing leg, wherein said second pin comprises a second securing pin to ensure that said second foot is not inadvertently removed from said second landing leg.

6. The apparatus of claim 1, wherein said first leg clamp comprises a first extending portion, wherein said first stabilizer rod comprises a receiving portion at a first stabilizer rod first end, wherein said first stabilizer rod is attached to said first leg clamp by inserting said first extending portion into said first stabilizer rod first end, wherein said second leg clamp comprises a second extending portion, wherein said second stabilizer rod comprises a second receiving portion at a second stabilizer rod first end, wherein said second stabilizer rod is attached to said second leg clamp by inserting said second extending portion into said second stabilizer rod first end.

7. The apparatus of claim 6, wherein said first extending portion comprises a first threaded hole through a wall of said first leg clamp and a nut on a piece of all-thread that is threaded into said first hole, wherein said second extending portion comprises a second threaded hole through a wall of said second leg clamp and a second nut on a second piece of all-thread that is threaded into said second hole.

8. The apparatus of claim 6, wherein said first extending portion comprises a first threaded hole through a wall of said first leg clamp and a nut on a first set-screw that is threaded into said first hole, wherein said second extending portion comprises a second threaded hole through a wall of said second leg clamp and a second nut on a second set-screw that is threaded into said second hole.

9. The apparatus of claim 1, wherein said first stabilizer rod and said second stabilizer rod cross at a crossing portion, wherein said center clamp is clamped around said first stabilizer rod and said second stabilizer rod at said crossing portion to rigidly support said vehicle.

10. The apparatus of claim 1, wherein said first stabilizer rod and said second stabilizer rod each comprise a steel tube.

11. The apparatus of claim 1, wherein said first leg clamp and said second leg clamp each include a pair of securing bolts for attaching said first leg clamp to said first landing leg and for attaching said second leg clamp to said second landing leg.

12. The apparatus of claim 1, wherein said first stabilizer rod comprises an extending portion having an indented portion or a hole to allow it to be connected to said second means of attachment or onto said first leg clamp, wherein said second stabilizer rod comprises a second extending portion having a second indented portion or a second hole to allow it to be connected to said first means of attachment or onto said second leg clamp.

13. The apparatus of claim 1, wherein said first stabilizer rod adjustment end and said second stabilizer rod adjustment end each comprises a length of all thread onto which is screwed an adjusting nut that has a piece of flat stock welded thereto.

14. The apparatus of claim 13, wherein said hollow end and said second hollow end each include an inner thread to receive said all thread.

15. A vehicle stabilization apparatus, comprising:
a first leg clamp for attachment to a first landing leg of said vehicle;
a second leg clamp for attachment to a second landing leg of said vehicle;
a first means for attachment to a lower portion of said first landing leg of said vehicle;
a second means for attachment to said second landing leg of said vehicle;
a first stabilizer rod for attachment between said first leg clamp and said second means for attachment;
a second stabilizer rod for attachment between said second leg clamp and said first means for attachment; and
a center clamp for clamping said first stabilizer rod and said second stabilizer rod together, wherein said first leg clamp comprises a three sided structure formed to conform to the outside of a portion of three sides of said first landing leg, wherein said three sided structure comprises at least one permanent magnet for rigid connection of said first leg clamp to said first landing leg, wherein said second leg clamp comprises a second three sided structure formed to conform to the outside of a portion of three sides of said second landing leg, wherein said second three sided structure comprises at least one second permanent magnet for rigid connection of said second leg clamp to said second landing leg.

16. The apparatus of claim 15, wherein said first leg clamp and said second leg clamp each comprise an extended portion for connection to said first stabilizer rod and said second stabilizer rod respectively.

17. A method for stabilizing a vehicle, comprising:
attaching a first leg clamp to a first landing leg of said vehicle;
attaching a second leg clamp to a second landing leg of said vehicle;
attaching a first means for attachment to a lower portion of said first landing leg of said vehicle;
attaching a second means for attachment to said second landing leg of said vehicle;
attaching a first stabilizer rod between said first leg clamp and said second means for attachment;
attaching a second stabilizer rod for attachment between said second leg clamp and said first means for attachment; and
clamping said first stabilizer rod and said second stabilizer rod together, wherein said first stabilizer rod comprises a hollow end configured to receive a stabilizer rod adjustment end and wherein said second stabilizer rod comprises a second hollow end configured to receive a second stabilizer rod adjustment end.

\* \* \* \* \*